United States Patent [19]

Furman

[11] 3,989,433

[45] Nov. 2, 1976

[54] APPARATUS FOR CONTROLLING RESISTANCE TO EXTRUSION OF A ROD-LIKE BODY THROUGH A DIE

[75] Inventor: Anthony H. Furman, Schenectady, N.Y.

[73] Assignee: General Electric Company, Schenectady, N.Y.

[22] Filed: Nov. 18, 1974

[21] Appl. No.: 524,577

[52] U.S. Cl. .................................. 425/149; 264/40.3; 425/311; 425/381; 425/466

[51] Int. Cl.$^{2}$ ............................................ B29F 3/06

[58] Field of Search ........... 425/466, 381, 145, 146, 425/147, 135, 149, 162, 166, 465, 140, 141, 188, 311, 192, 190; 264/148, 15 D, 40

[56] References Cited

UNITED STATES PATENTS

| | | | |
|---|---|---|---|
| 1,775,735 | 9/1930 | Reker | 425/381 |
| 3,131,430 | 5/1964 | Rodenacker | 425/146 |
| 3,164,863 | 1/1965 | Hunt | 425/146 X |
| 3,381,072 | 4/1968 | Mutton et al. | 264/148 |
| 3,482,285 | 12/1969 | Falkenberg | 425/146 |
| 3,642,405 | 2/1972 | Eggenberger et al. | 425/149 |
| 3,850,568 | 11/1974 | Bartha et al. | 425/466 |
| 3,865,528 | 2/1975 | Roess | 425/466 X |

FOREIGN PATENTS OR APPLICATIONS

| | | | |
|---|---|---|---|
| 1,179,356 | 10/1964 | Germany | 425/380 |

*Primary Examiner*—Ronald J. Shore
*Assistant Examiner*—Mark Rosenbaum
*Attorney, Agent, or Firm*—Leo I. MaLossi; Joseph T. Cohen; Jerome C. Squillaro

[57] ABSTRACT

Improved extrusion apparatus is shown for the preparation of a rod-like body from a coal-containing particulate mixture. Control mechanisms are disclosed for automatically controlling the throughput resistance experienced by the rod-like (or a developing version thereof) body through a die. Portions of the die wall near the outlet end thereof are adapted for inward displacement in response to these control mechanisms. This embodiment may also be coupled with a longitudinally movable die and control means for adjusting the length of the consolidating coal-containing mixture in contact with the surface of the movable die.

14 Claims, 5 Drawing Figures

APPARATUS FOR CONTROLLING RESISTANCE TO EXTRUSION OF A ROD-LIKE BODY THROUGH A DIE

BACKGROUND OF THE INVENTION

Apparatus for the extrusion of a cohesive, continuous rod-like coal-containing body directly into coal gasification apparatus, which body is subdivided into briquettes for distribution in the gasification apparatus, is disclosed in U.S. Pat. application Ser. No. 316,455 - Furman (now abandoned) filed Dec. 19, 1972 and assigned to the assignee of the instant invention.

DESCRIPTION OF THE INVENTION

Improved extrusion apparatus is described herein for the preparation of a rod-like body from a coal-containing particulate mixture. Control mechanisms are disclosed for automatically controlling the throughput resistance experienced by the rod-like (or developing version thereof) body through a die.

In the preferred embodiment, portions of the die wall near the outlet end thereof are adapted for inward displacement as a function of the work required to drive the extruder screw. In addition, means are provided for direct visual examination of the coal-containing body leaving the die whereby, depending upon the appearance of the extruded body, it may be ascertained whether the extrusion process is being satisfactorily conducted.

Other embodiments are also disclosed in which the movable die wall portions are coupled with a longitudinally-movable die and control means for adjusting the length of the consolidating coal-containing mixture in contact with the surface of the movable die. This adjustment of die length is conducted either as a function of the hydraulic pressure conditions required to maintain the movable die position or, alternatively, as a function of the work required to drive the extruder screw.

The embodiments for adjusting die length are described and claimed in U.S. Pat. application Ser. No. 524,576 - Furman filed Nov. 18, 1974 and assigned to the assignee of the instant invention.

Although hydraulic mechanisms are disclosed herein for effectuating movable die length adjustment, the use of other equivalent (e.g. electromechanical) means are contemplated and are included within the scope of this invention. Specific commercially available sensing and control devices disclosed herein are solely illustrative.

The use of the apparatus of this invention for the preparation of rod-like briquettes of various compositions and characteristics using either swelling or non-swelling particulate coal together with suitable binder material and with or without the addition of other materials, e.g. agents for overcoming swelling, is contemplated. Preferably, briquettes prepared by the use of the apparatus of this invention retain their shape and are able to support themselves at least through a temperature exposure of about 950° F. Typically, during exposure to such a temperature, devolatization will occur leaving a charred briquette.

Although the instant invention is illustrated for the production of a solid rod extrudate, a hollow rod extrudate can also be advantageously produced as by modifying the extruder screw to provide a centrally-located rod extension (not shown herein) to form the hole.

Materials for construction of the extrusion apparatus, sight port, drive means, heating means, control means, discharge means, etc. are conventional.

BRIEF DESCRIPTION OF THE DRAWING

The exact nature of this invention as well as objects and advantages thereof will be readily apparent from consideration of the following specification relating to the annexed drawing in which.

MANNER AND PROCESS OF MAKING AND USING THE INVENTION

Figures 1, 2:
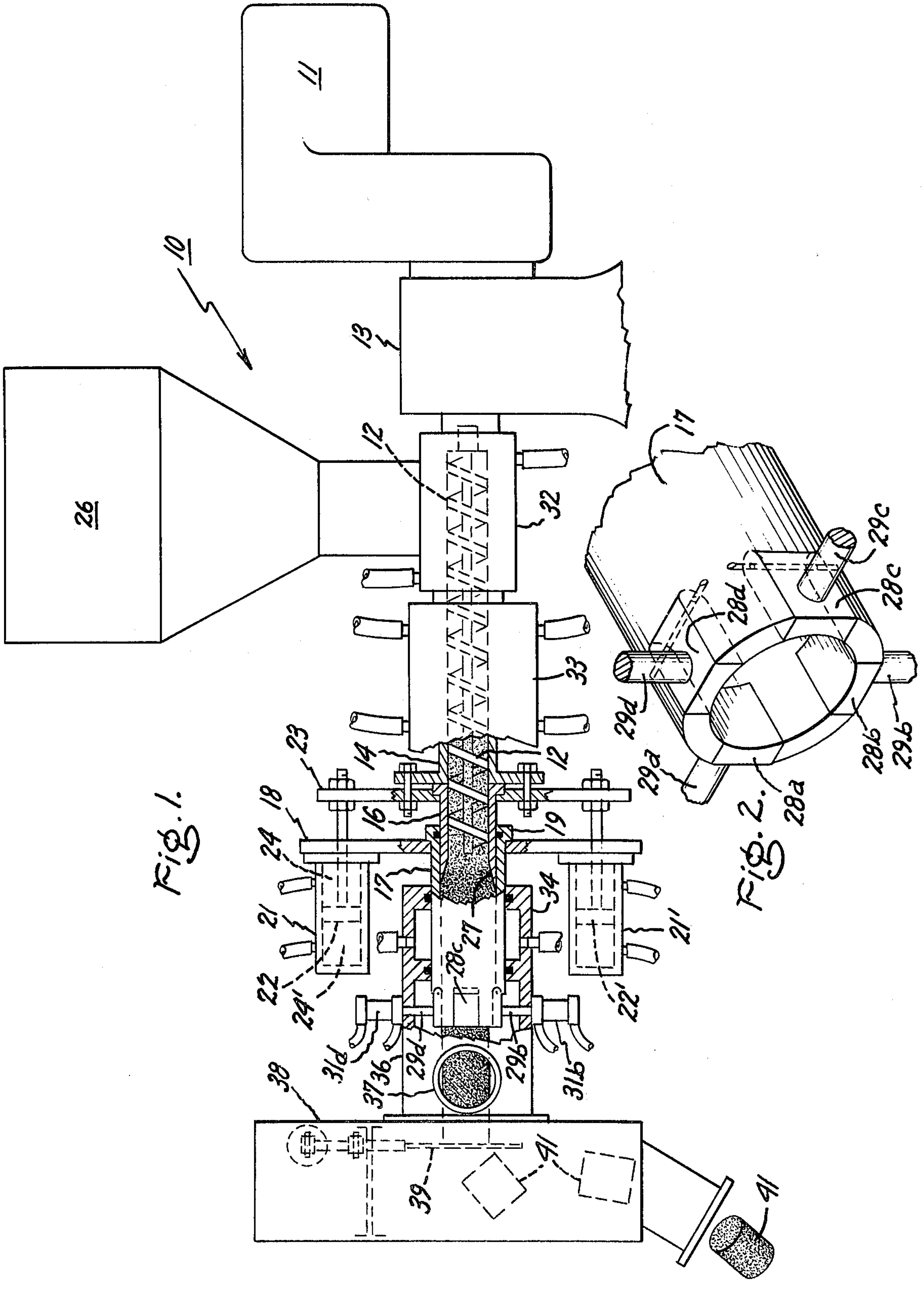
FIG. 1 is a schematic representation, partially cut away, embodying die construction illustrative of the improvement of the instant invention in combination with means for adjusting the length of the die.
FIG. 2 is a three-dimensional view showing the disposition of a number of die wall portions pivotally attached to the die wall.

The improved extrusion apparatus 10 of the instant invention is illustrated in FIG. 1 as employing in combination drive motor 11 coupled to extruder screw 12 via variable speed control 13, screw 12 being disposed within extruder barrel 14 shown with an extension 16 therefor. Elements 14 and 16 may, of course, be constructed as a unified construction, rather than as joined pieces. However, the construction shown facilitates easy replacement of the outer end of the extrusion barrel, this being the portion thereof subject to greatest wear. Die means 17 of substantially constant cylindrical internal cross-section is disposed with a portion of the inner surface thereof in telescoping relationship with the outer wall surface of barrel portion 16, being positioned therealong by force applied by plate 18 against shoulder 19 of die 17 under the influence of die actuator hydraulic cylinders 21, 21'. Although the use of a pair of such die actuators has been found to be adequate, a larger number may be employed. The pistons 22, 22' of the die actuators are stationary, being affixed to plate 23 which also serves to fixedly locate barrel portion 16 as shown.

Considering cylinder 21 by way of example, as hydraulic fluid is introduced under pressure into region 24 behind piston 22 (hydraulic fluid being simultaneously withdrawn from region 24' in front of piston 22) cylinder 21, and thereby plate 18 and die 17, are moved toward plate 23. This action reduces the amount of internal die area available for contact with the coal-containing mixture as it becomes consolidated within the die under the action of extruder screw 12. Such a condition produces reduced frictional resistance between the consolidating body and the die, thereby resulting in a less dense rod-like body. The reverse action (removal of hydrauliic fluid from region 24 and introduction of such fluid to region 24') permits die 17 to slidably move away from plate 23 under the action of the frictional force acting between the consolidating coal-containing mixture and the inner surface of die 17.

Action of the adjustable die 17 under operating conditions is described in greater detail in connection with FIGS. 4 and 5 herein below.

Figure 3:
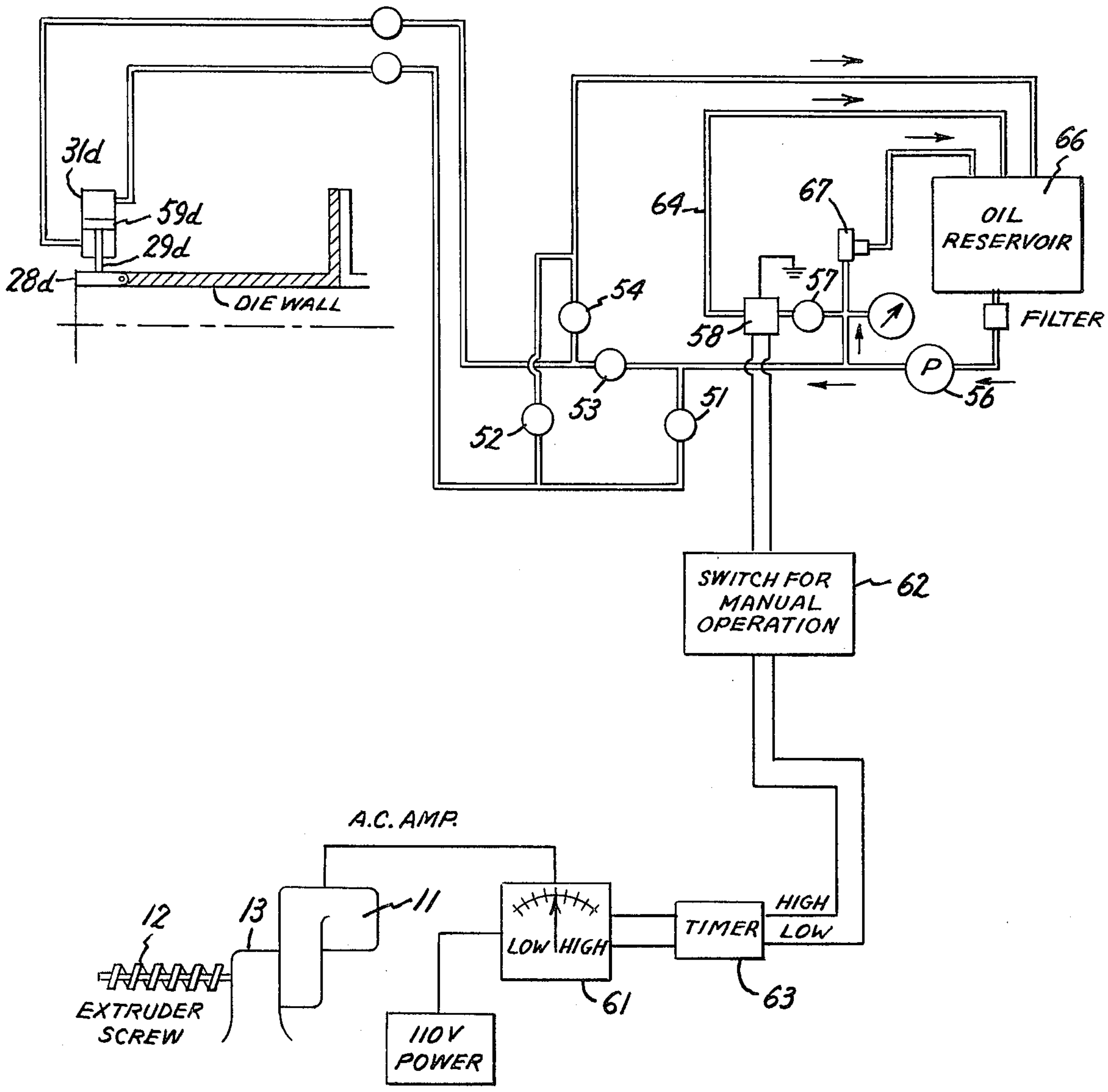
FIG. 3 is a schematic representation of sensing and control means for inwardly biasing the movable die wall portions in accordance with the instant invention in response to a parameter reflecting the work performed in the extrusion process.

As is shown in FIGS. 1, 2, and 3, the consolidating coal-containing mixture passing through die 17 must interact with movable die wall portions (e.g. pivotally mounted elements 28*a*, 28*b*, 28*c* 28*d*) referred to herein as flappers. These flappers are adapted to be urged, or biased, inwardly of die 17 by rods 29*a*, 29*b*, 29*c* and 29*d* respectively. Inward displacement of these flappers creates discontinuities in the cylindrical configuration of the inner surface of the wall of die 17, the greater the inward displacement, the greater the degree of discontinuity. These rods are actually attached to pistons movable in the housings of the fixed hydraulic flapper-actuators (actuators 31*b* and 31*d*, only, are shown). Depending upon the extent of inward force exerted by the rods on the flappers, varying amounts of resistance can be offered to the passage of the consolidating (or consolidated) coal-containing mixture out of die 17.

Thus, in the embodiment of improved extrusion apparatus 10 illustrated in FIG. 1, a particulate mixture comprising coal and a binder therefor are introduced into barrel 14 from feed means 26 in flow communication therewith, is moved toward die 17 under the action of the flights of extruder screw 12 and is forced out of barrel portion 16 provided with knife edge 27 and into die 17. Within die 17, by the combined action of force applied by extruder screw 12 and the friction developed between the moving, coal-containing mass and the inner surface of die 17, consolidation into a rod-like body results. The total friction encountered by the coal-containing mass is determined by the adjusted length of die 17 and the extent of inwardly directed force exerted by flappers 28*a*, 28*b*, and 28*d* on the rod-like body. At various stations along the length of the extruder barrel and die 17 means are shown for selectively and controllably heating the coal-containing mixture as it is moved along the extrusion path for consolidation in die 17. These heating means, designated by numerals 32, 33, and 34, are provided with inlet and outlet ports via which the heat transfer fluid is circulated.

As the rod-like coal-containing body contacts and passes the flappers and emerges from die 17 within housing 36, the condition of the surface thereof may be viewed through sealed sight port 37 equipped with a transparent wall portion made of glass or plastic. If the emerging rod-like body is not sufficiently dense (as may be ascertained by visual examination of the surface thereof), adjustments may be made in the system as will be described hereinbelow to properly correct for this condition.

The continuous rod-like body passes into chopper mechanism 38 in which a guillotine blade 39 automatically subdivides the rod into briquettes 41. In the event that extruder apparatus 10 is being used for charging a coal gasifier, briquettes 41 pass directly into the interior of the gasifier (not shown) in which case the interior of device 38 is exposed to the pressure/temperature conditions of the gasifier and must be constructed accordingly.

Referring to FIG. 3, wherein inwardly movable die wall portions 28*a*, 28*b*, 28*c* and 28*d* are the sole means relied upon for the application of controllable resistance to the moving, coal-containing mass, die 17 is empty at start-up and the flappers are positioned inwardly as far as is permitted by the construction. Valves 51, 52, 53 and 54 are manually set and for most operating conditions, valves 51 and 54 are open while valves 52 and 53 are closed. Simultaneous inward positioning of the flappers is accomplished by starting pump 56 to pressurize the hydraulic circuit, manually opening valve 57 and setting metering valve 58 (Hoke Auto Valve No. 0121F2E) for a pressure at which it is anticipated that the unit will be operated for the given coal being employed. Preferred operating pressures may be readily determined by routing testing. For ease of explanation, the operation of only one flapper/actuating cylinder combination will be described. It is to be understood that a preselected number of such combinations may be employed and simultaneously actuated. With pump 56 operating, pressurized hydraulic fluid enters hydraulic actuator 31*d*, outwardly of piston 59*d* causing movement of the piston towards the die wall and, in turn, pivotally displacing flapper 28*d* inwardly of the die under the thrust of shaft 29*d*. Simultaneously hydraulic fluid leaves hydraulic actuator 31*d* inwardly of piston 59*d*.

With the flappers disposed inwardly to the full extent of their permissible displacement, they will restrict the passage of the powdered coal-containing mixture entering the die until a solid rod begins to develop. As the rod consolidates, it will exert force against the flappers displacing them to the nearly full open position. The term "full open" means open to the position shown in FIG. 2 wherein the flapper position coincides with the inner diameter of the die. By the time the flappers have been moved to the nearly full open position, the developing rod should have achieved the desired density and cohesiveness. The development of this body and the increase in cohesiveness and density can be viewed (e.g. surface smoothness and shininess) through sight port 37. At the same time, the changing density characteristics are indicated by a change in the reading displayed by meter relay 61 (Simpson 0–5A A.C. Meter Relay Dual [High Low Setpoint]) reflecting current demand of the screw motor 11. Thus, the operator can rely on two sources of visual observation in order to judge the appropriateness of actuating switch 62 to change from manual operation to automatic control.

Having connected switch 62 to convert from manual operation to automatic control, as a solidifying rod-like body begins to be discharged from the die, automatic control of the force exerted by the flappers on the solidifying body begins to be effective (i.e., with valves 51 and 54 open and valves 52 and 53 closed). If desired, while still in the regime for manual operation, valves 51 and 54 may be closed and valves 52 and 53 opened to forcefully pivot the flappers to a more open, or the full-open position.

In the event that too great a pressure is being exerted by the flappers against the emerging rod-like body, motor 11 will draw a higher than normal current and this condition will be sensed by meter relay 61. Meter relay 61 is equipped with adjustable high and low set points for the closing of separate switch contacts (not shown). When too high a motor current is drawn, the meter relay high set point switch contact is tripped permitting an electrical signal to pass to timer 63 (Cam Timer No. 1600A090).

Timer 63 provides for interrupted passage therethrough of the electrical signal received thereby (i.e., the electrical signal can enter the circuit shared by the high set point switch with metering valve 58, whereby movement of this valve toward a more open position is effected for a preselected time period). The preselected time provides a delay period during which the system can respond to the changed conditions and provide feedback information reflecting these changed conditions. This precaution avoids "hunting" in the system. Metering valve 58 starts (i.e. moves to a more open position) and stops in response to the operation of timer 63. Achievement of a more open position for metering valve 58 reduces the pressure in the hydraulic system thereby diminishing the inwardly directed force exerted by the flappers via hydraulic actuators (i.e. actuator 31*d* and comparable units).

Valve 57 will, of course, have been manually set in the open position at least upon initiation of automatic operation. Hydraulic fluid under pressure is provided in the hydraulic circuit (or hydraulic fluid supply means) shown. Displacement pump 56 may operate continuously or be automatically actuated. When pump 56 operates, fluid under pressure is admitted to the hydraulic flapper actuators (i.e., unit 31*d*), to bypass circuit 64 (via valves 57 and 58) leading to reservoir 66 or, if the pressure has become high enough for some reason, to and from the oil reservoir 66 via pressure release valve (PRV) 67.

The resulting stepwise adjustment of metering valve 58 to a more open position thereby results in reduction in the frictional resistance experienced by the consolidating coal-mixture. This lessened friction, in turn, reduces the density of the rod being formed in the die. The load on motor 11 is thereby reduced into the desired operating range until the meter relay high set point switch opens and further intermittent operation of metering valve 58 ceases. The metering valve retains the setting achieved until further automatic adjustment occurs.

Under the operating conditions in which insufficient inwardly directed force is being exerted by the flappers, the motor current draw is too low. As motor relay 61 senses this condition the meter relay low set point switch is tripped. An electrical signal is sent to timer 63 for intermittent passage (as described above) therethrough into the low force (biasing the flappers inwardly) circuit. Via this circuit, an electrical signal reaches valve 58 whereby this valve is moved to a more closed position in a stepwise fashion thereby increasing the hydraulic system pressure. This increase in pressure increases the inwardly directed force exerted by the flappers and the frictional resistance experienced by the consolidated coal-containing mixture is increased. As a result, the density of the rod being formed in the die is increased and the load on the motor is, in turn, increased. When the valve of the current being drawn by the motor enters into the desired operating range, the effect is to open the low set point switch and cut off the signal input to timer 63. Metering valve 58 retains its adjusted position until repositioning occurs as a result of exercise of the automatic control function.

Figure 4:
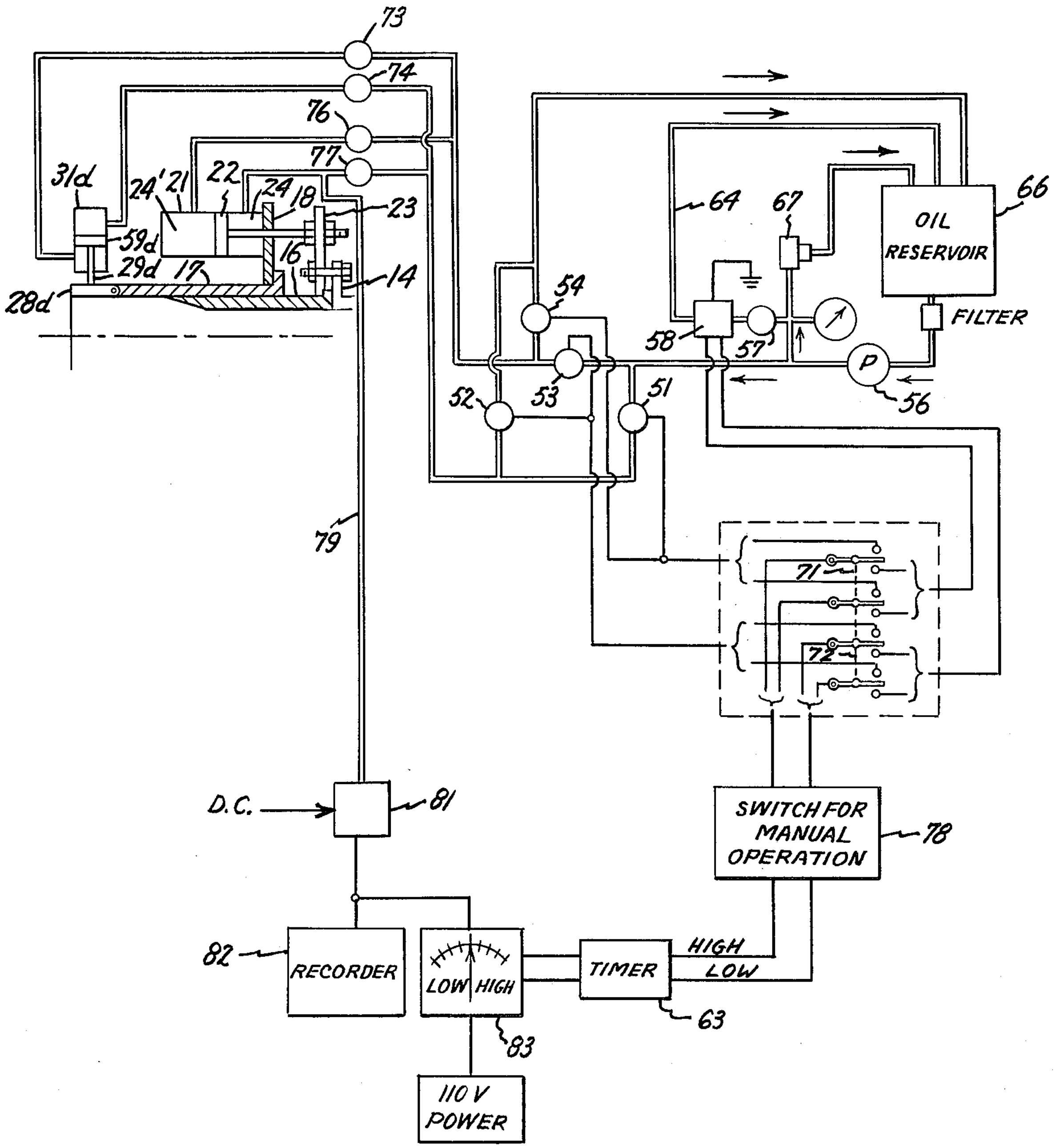
FIG. 4 is a schematic representation of sensing and automatic control means for inward biasing of the movable die wall portions shown together with optionally-actuable die-position control means; in both cases the automatic control signal being generated by hydraulic pressure feedback from the die-position control means

In the extrusion and control structure schematically represented in FIG. 4, selectively operable control systems are provided whereby the die length may be automatically controlled and the inwardly-directed pressure exerted by the flappers of this invention may be automatically controlled. In the arrangement shown, these modes of control are selected by appropriate manual positioning of double pole - double throw switches 71 (for the high pressure circuit) and 72 (for the low pressure circuit). When selection of the automatic adjustment mode is made, certain other adjustments opening or closing valves in the hydraulic system will be required as indicated hereinbelow.

On start-up of an extrusion apparatus embodying both the inward displacement of portions of the die wall near the outlet end thereof and adjustment of the die length, positioning of these mechanisms is accomplished by manual manipulation of the appropriate hydraulic circuitry. First, die 17 is moved to the near fully extended position or (if operating information is available for the particular coal being used) to some preselected position short of the fully extended position. Thereafter, the flappers (i.e., element 28*d* and elements similar thereto) are moved to the full in position. Both positioning of the die and positioning of the flappers is accomplished manually in the manner described. To position the die, valves 73, 74 are closed (valves 76 and 77 remaining open). With pump 56 operating and with solenoid valves 51 and 54 (ASCO Solenoids No. 967399) manually opened, hydraulic fluid is introduced into volume 24 and removed from volume 24' to the extent required. This manual solenoid valve adjustment is maintained until die 17 is properly positioned. Next, valves 76 and 77 are closed and valves 73 and 74 are moved to the open position. Once again, with pump 56 operating and solenoid valves 51 and 54 manually adjusted to the open position, piston 59*d* is moved toward die 17 producing the requisite repositioning of the flapper 28*d* via piston rod 29*d*. It is to be understood that although the description herein is limited to control sequences for one hydraulic die actuator and one hydraulic flapper actuator, a plurality of each of these types of mechanisms would be employed with the hydraulic die actuators being repositioned simultaneously and the hydraulic flapper actuators being repositioned simultaneously.

Once the movable die and flappers have been positioned for start-up, the particular mixture comprising coal and a binder therefor is introduced into barrel 14 from feed means 26 and is forced out of barrel extension 16 into die 17. Placement of the flappers will restrict the passage of the particulate mixture until a solid rod begins to develop. As the rod consolidates, it will reset the flappers to the nearly full open position. At the same time the developing rod will exert a friction force over the inner surface of the wall of die 17. Solenoid valves 51 and 54 remain in the open position, valves 76 and 77 are closed and valves 73 and 74 are open.

In order to initiate automatic control, manual switch 78 is connected to enable the passage therethrough of electric signals from timer 63 as such signals are generated. Next, the double pole-double throw switches 71 and 72 are positioned so that electric signals from timer 63 will be passed to metering valve 58. At all times, the pressure in hydraulic cylinder 21 (volume 24) is sensed via line 79 and is converted to an electrical signal by transducer 81 (Dynisco 0-500 PSI Pressure Transducer No. PT119H-5C). Requisite D.C. input to transducer 81 is provided from a power supply (Lambda Regulated Power Supply [D.C.] Model LE101), not shown. The voltage signal output from transducer 81 is simultaneously fed to recorder 82 (Leeds and Northrup 0–50 mv Strip Recorder Speedomax H, No. 3-932-000-045-6-15-80) for the generation of a visual display and to a meter relay 83 (Calex Volt-sensor, Model 512A having adjustable high and low set points for the closing of separate switch contacts (not shown). Meter relay 83 is similar in function to meter relay 61.

A meter-type relay is preferred, because it facilitates setting of a high and low switch points and provides a second (in addition to the recorder 82) visual indication of the extent to which rod compaction is occurring).

If the condition should develop in which the sum of the forces exerted against the surface of the rod by the flappers and the friction between the developing rod and the inner wall of die 17 are excessive, the electrical signal from transducer 81 will increase to a value causing the high set point of meter relay 83 to trip and close the switch (not shown), which sends an electrical signal to timer 63.

Timer 63 provides for interrupted passage therethrough (as described hereinabove) of the electrical signal received thereby and as metering valve 58 receives the electrical signal from timer 63, metering valve 58 is moved in a stepwise manner to a more open position. These successive actions gradually reduce the pressure in the hydraulic system, the PRV is by-passed, and the hydraulic pressure in the flapper actuators and, thereby, the force exerted by the flappers is reduced. As less force is exerted by the flappers against the rod, there is a reduction in the resistance to the passage of the forming rod through die 17. In turn, the pressure sensed by transducer 81 is reduced whereby the voltage signal from the transducer to meter relay 83 decreases resulting in opening of the high set point switch, which stops further adjustments of metering valve 58.

If, even with the flappers in full-out position, the developing rod still encounters too much resistance to passage through die 17, this condition will be manifest on recorder 82 alerting the operator that further adjustjustment (adjustment of the die length) is required. The double pole-double throw switches 71, 72 are manually thrown to provide automatic control of the positioning of die 17 via the solenoid valves 51, 52, 53, 54. This action initially results in closure of solenoids 51, 54 from their previous open position. Valve 57 is moved to the closed position whereby pump 56 is able to raise the hydraulic system pressure to that determined by the PRV setting. Valves 73 and 74 are closed and valves 76 and 77 are opened. The pressure sensed by sensor 81 will, of course, be too high and will result in transmission of a signal to motor relay 83 tripping the high set point and actuating the high set point switch to send a signal to timer 63. The intermittent passage of this signal to the solenoid valves results in the opening of solenoid valves 51 and 54 (solenoid valves 52 and 53 remain closed). Stepwise opening and closing of valves 51 and 54 produces stepwise movement of plate 18 toward plate 23 resulting in gradual shortening of the length of die 17 in contact with the developing rod. The result is a progressively decreasing frictional resistance between the inner surface of the die wall and the consolidating rod. This stepwise readjustment continues until the voltage signal from transducer 81 to meter relay 73 has decreased enough so that the meter relay high set point switch opens. Further intermittent operation of solenoid valves 51 and 54 ceases and the valves remain closed. Double pole-double throw switches 71, 72 are then repositioned to provide control over the magnitude of flapper pressure via controlled operation of metering valve 58. Valve 57 and solenoid valves 51 and 54 are reopened. From this point on, automatic control over flapper pressure should suffice.

With double pole-double throw switches 71, 72 positioned for flapper control (valves 76, 77 closed and valves 73, 74 open), if transducer 81 senses too low a pressure, indicating insufficient density in the developing coal-containing rod, the voltage signal from transducer 81 to meter 83 will be so low that the low set point is tripped closing a switch and sending an electrical signal to timer 63 for intermittent signal passage therethrough into the low pressure circuit. Metering valve 58 is intermittently moved to a more closed position in which pressure in the hydraulic system increases thereby increasing the force applied by the flapper actuators to push the flappers against the coal-containing rod. This increased pressure will result in cessation of the repositioning of metering valve 58 as described hereinabove. However, if in viewing through the sight port 37, the operator sees that the pressure applied by the flappers has positioned the flappers inwardly to the point that the flappers are deforming the extrudate excessively, he will then proceed with axial repositioning of die 17. That is, double pole-double throw switches 71 and 72 are repositioned to enable actuation of the solenoid valves, valves 73 and 74 are closed, valves 76 and 77 are opened, and valve 57 is closed. As noted earlier, resetting of the double pole-double throw switches automatically closes solenoids 51 and 54. Thereafter, transducer 81 initiates operation via the low pressure circuit to bring about intermittent opening of solenoids 52 and 53 resulting in outward movement (plate 18 moves away from plate 23) of die 17 to the extent required.

Figure 5:
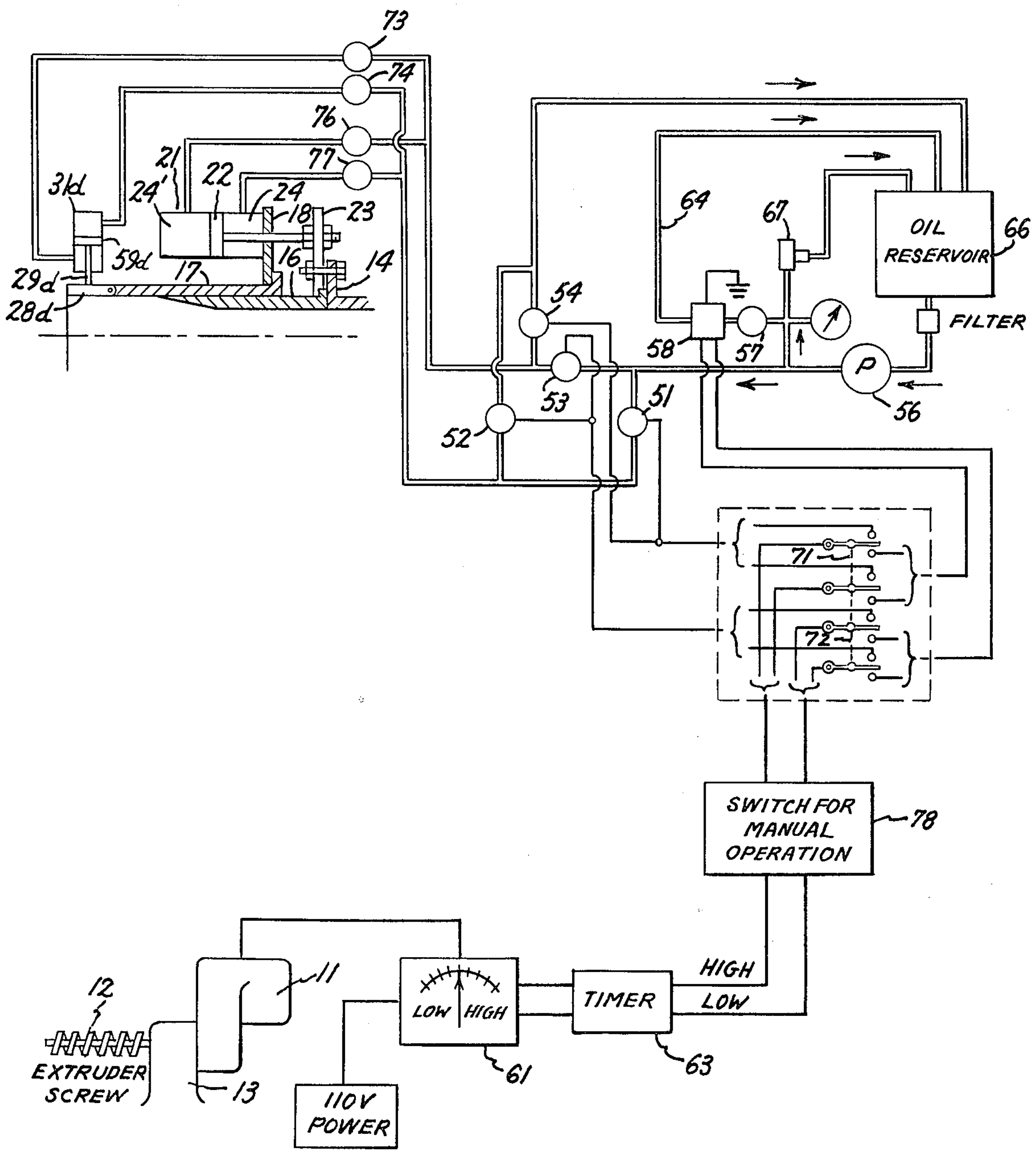
FIG. 5 is a schematic representation of sensing and automatic control means optionally available for positioning the inwardly movable portions of the die wall or for adjusting the die length in response to a parameter reflecting the work performed in the extrusion process. As is shown in FIGS. 4 and 5, electrical connections shown are actually multi-wire cables providing complete electrical circuits between the elements connected.

Alternate mechanism for providing automatic control of the flapper/adjustable die combination is shown in FIG. 5. As in FIGS. 3 and 4 in order to simplfy the drawing, only fragmented portions of the die and extruder and only one each of the flappers, flapper actuators and hydraulic die actuators are set forth. The hydraulic system including the solenoid valves is the same as is described in FIG. 4. In essence, this alternate method provides automatic control in response to the work required to rotate the extruder screw as in the automatic control of FIG. 3.

Thus, in FIG. 5 the motor current draw by motor 11 is sensed by meter relay 61 (described in connection with FIG. 3). When excessive resistance is encountered by the developing rod-like body in its passage through die 17, the motor current draw increases, because motor 11 must work harder. When the opposite condition occurs, that is, when too little resistance is encountered by the developing rod-like body, motor 11 has less of a demand placed upon it to rotate the extruder screw and, consequently, the motor current draw is low. Tripping of the set points (high and low), closing of the relay switches thereby, operation of timer 63 and operation of the hydraulic system in response to too high or too low motor current draw is the same as operation described hereinabove with respect to too high or too low pressure feedback (FIG. 4).

As is described in connection with FIG. 4, if too high a motor current draw is encountered, the attempt is first made to correct this condition by the use of automatic control via metering valve 58 as described in FIG. 4. If, even with the flappers in the full-out position there is still too much resistance to the transit of the coal-containing rod through the die, the double pole-double throw switches 71, 72 are manually thrown to energize the automatic control mode employing solenoid valves 51, 52, 53 and 54 with appropriate settings for valve 57 and valves 73, 74, 76 and 77 as described. After appropriate readjustment of the length of die 17, the double pole-double throw switches 71, 72 are repositioned to provide control of the forces applied to the coal-containing rod via the flappers as described in FIg. 4. Similarly, operation of the control systems, when the motor current draw is too low, is the same as has been described hereinabove.

In the best mode contemplated of this invention pivotally connected flappers are employed; four flappers for smaller (about 2 inches) diameter dies and six flappers on dies larger than about 4" in diameter are used; the inside surface of the flapper matches the contour of the die to which it is affixed; flapper length is at least as long as the die diameter and flapper width is about equal to one-half the radius of the die. The preferred arrangement is shown herein for heating the die, barrel and feed area.

When the flappers are used in combination with the axially adjustable die, the extent of axial adjustment available in the die should be about 1½ times the diameter of the die.

In practicing the method of this invention it is preferred that the particles of material entering the apparatus be free-flowing or reltively so.

I claim:

1. In an apparatus for the extrusion of a cohesive, continuous, rod-like coal-containing body wherein an extruder screw is disposed within extruder barrel construction, which in turn is connected to feed and discharge structures spaced from each other, said feed structure being means for feeding a mixture containing powdered coal and a binder into said barrel construction and said discharge structure being die means for receiving and shaping the mixture forcibly discharged from said barrel construction, means being provided adjacent said barrel construction for heating at least a portion thereof, means positioned downstream of said die means for severing the emerging rod-like body into smaller portions and means connected to said screw for driving said screw, the improvement comprising:

a. said die means being open-ended and of substantially constant cylindrical configuration internally, the wall of said die means having a plurality of spaced apart movable portions thereof adapted for inward displacement to selectively change the degree of discontinuity of the inner surface of said wall for contact with the mixture in transit therethrough, and b. means engaging each of said movable wall portions for controllably varying the force with which said movable wall portions may be displaced inwardly, said force varying means including means for the automatic actuation thereof as a function of the force exerted by the means for driving the extruder screw.

2. The improvement of claim 1 wherein the movable wall portions are pivotally connected to the wall of the die means.

3. The improved apparatus of claim 1 wherein an electric motor is employed to drive the extruder screw and the force varying means comprise hydraulically-actuated biasing means contacting the movable wall portions, means electrically connected to said motor for sensing the current draw thereof, hydraulic fluid supply means in flow communication with said biasing means in a hyraulic circuit and means electrically connected to said sensing means and connected in said hydraulic circuit for varying the pressure of the hydraulic fluid in said hydraulic circuit.

4. The improved apparatus of claim 3 wherein the pressure varying means includes a relay, a timer and a metering valve, said relay being connected to the sensing means and having high and low set point switches, said switches being connected to the input circuitry of said timer, said metering valve being electrically connected to the output circuitry of said timer and being in flow communication with both the hydraulic fluid supply means and the biasing means.

5. The improved apparatus of claim 1 wherein an electric motor is employed to drive the extruder screw and the force varying means comprise hydraulically-actuated biasing means contacting the movable wall portions, means electrically connected to said motor for sensing the current draw thereof, hydraulic fluid supply means in flow communication with said biasing means in a hydraulic circuit and means electrically connected to said sensing means and connected in said hydraulic circuit for varying the pressure of the hydraulic fluid in said hydraulic circuit.

6. The improved apparatus of claim 5 wherein the pressure varying means includes a relay, a timer and a metering valve, said relay being connected to the sensing means and having high and low set point switches, said switches being connected to the input circuitry of said timer, said metering valve being electrically connected to the output circuitry of said timer and being in flow communication with both the hydraulic fluid supply means and the biasing means.

7. In an apparatus for the extrusion of a cohesive, continuous, rod-like coal-containing body wherein an extruder screw is disposed within extruder barrel construction, which in turn is connected to feed and discharge structures spaced from each other, said feed structure being means for feeding a mixture containing powdered coal and a binder into said barrel construction and said discharge structure being die means for receiving and shaping the mixture forcibly discharged from said barrel construction, means being provided adjacent said barrel construction for heating at least a portion thereof, means positioned downstream of said die means for severing the emerging rod-like body into smaller portions and means connected to said screw for driving said screw, the improvement comprising:

a. said die means being open-ended and of substantially constant cylindrical configuration internally, the wall of said die means having a plurality of spaced apart movable portions thereof adapted for inward displacement to selectively change the degree of discontinuity of the inner surface of said wall of said die means for contact with the mixture in transit therethrough, b. means engaging each of said movable wall portions for controllably varying the force with which said movable wall portions may be displaced inwardly, c. a portion of the inner surface of said wall of said die means being in telescoping relationship with the outer surface of the wall of said barrel construction and d. means connected to said die means for controllably varying the extent of intenal surface area of said die means available for contact with the mixture in transit therethrough, said varying means being adapted to provide relative movement between said die means and said barrel construction.

8. The improved apparatus of claim 7 wherein the internal surface area varying means and the force varying means are both responsive to means for the automatic actuation thereof as a function of the force required to hold the die means in a given position relative to the extruder barrel construction.

9. The improved apparatus of claim 8 wherein the internal surface area varying means comprise hydraulically-actuated positioning means connected to the die means, means in flow communication with said positioning means for sensing hydraulic pressure therein and generating a voltage signal in response thereto, means electrically connected to said sensing and generating means for selectively placing hydraulic fluid supply means in flow communication with said positioning means for actuating said positioning means to reposition said die means.

10. The improved apparatus of claim 9 wherein the means for selectively placing in flow communication includes a relay, a timer and plurality of electrically-actuable valves, said relay being connected to said sensing and generating means and having high and low set point switches, said switches being connected to the input circuitry of said timer, said valves being electrically connected to the output circuitry of said timer and being in flow communication with both the hydraulic fluid supply means and the positioning means.

11. The improvement of claim 7 wherein the force varying means and the internal surface area varying means are optionally actuable.

12. The improved apparatus of claim 7 wherein the internal surface area varying means and the force varying means are both responsive to means for the automatic actuation thereof as a function of the force exerted by the means for driving the extruder screw.

13. The improved apparatus of claim 12 wherein an electric motor is employed to drive the extruder screw and the force varying means comprise hydraulically-actuated biasing means contacting the movable wall portions, means electrically connected to said motor for sensing the current draw thereof, hydraulic fluid supply means in flow communication with said biasing means in a hydraulic circuit and means electrically connected to said sensing means and connected in said hydraulic circuit for varying the pressure of the hydraulic fluid in said hydraulic circuit.

14. The improved apparatus of claim 13 wherein the pressure varying means includes a relay, a timer and a metering valve, said relay being connected to the sensing means and having high and low set point switches, said switches being connected to the input circuitry of said timer, said metering valve being electrically connected to the output circuitry of said timer and being in flow communication with both hydraulic fluid supply means and the biasing means.

* * * * *